United States Patent [19]

Hoogesteger

[11] Patent Number: 4,770,520
[45] Date of Patent: Sep. 13, 1988

[54] PROTECTIVE COVER FOR TURRET ASSEMBLY OF AN OPTICAL INSTRUMENT

[75] Inventor: Paul A. Hoogesteger, Penfield, N.Y.

[73] Assignee: Cambridge Instruments Inc., Buffalo, N.Y.

[21] Appl. No.: 35,810

[22] Filed: Apr. 8, 1987

[51] Int. Cl.[4] .......................... G02B 21/00; G02B 7/00
[52] U.S. Cl. ...................................... 350/589; 350/520
[58] Field of Search ............... 350/589, 587, 582, 585, 350/507–536, 502, 319, 579, 580

[56] References Cited

FOREIGN PATENT DOCUMENTS

849186  9/1952  Fed. Rep. of Germany ...... 350/520

Primary Examiner—Jon W. Henry
Attorney, Agent, or Firm—Alan H. Spencer

[57] ABSTRACT

A cover member is set forth which protects the rotatable turret and objectives of an inverted microscope from exposure to corrosive or otherwise potentially harmful substances.

3 Claims, 8 Drawing Sheets

PROTECTIVE COVER FOR TURRET ASSEMBLY OF AN OPTICAL INSTRUMENT

CROSS-REFERENCE TO RELATED APPLICATIONS

This application is related to Ser. No. 035,808 filed Apr. 8, 1987, entitled "Quick Disconnect Stage Assembly for Optical Instruments" for inventor Henry J. Emmel; Ser. No. 035,807 filed Apr. 8, 1987, entitled "Apparatus for Indicating Intensity of an Illuminator in an Optical Instrument" for inventor Henry J. Emmel; Ser. No. 035,844 filed Apr. 8, 1987, entitled "Adjustable Crank and Linkage Assembly for Zoom Lens Optical System" for inventors James A. Clark and Michael H. Dobner; and Ser. No. 035,812 filed Apr. 8, 1987, entitled "Zoom Optical System Having Reticle Positioned at Image Plane of Objective" for inventor Leonard J. Maziarski, all filed concurrently herewith.

BACKGROUND OF THE PRIOR ART

1. Field of the Invention

The present invention is directed toward a protective cover for fitting over and sealing the rotatable turret of a microscope and the threaded portions of the objectives secured thereto.

2. Description of the Prior Art

In the past, the turret assemblies of inverted microscopes were liable to be exposed to a great number of contaminants which were being used on the stage assembly. The potential occurred because the contaminants were supported on the stage which is positioned directly above the turret and the objectives fixed thereto. Therefore, foreign substances could potentially drip from the stage and onto the turret and/or objectives. These substances could be corrosive and cause damage to the threads of the objectives or to the turret bearings.

The present invention sets forth a cover member which overcomes the above-referenced problems.

SUMMARY OF THE INVENTION

The present invention is directed toward a cover member which seals and protects the rotatable turret and objectives of an inverted microscope.

DETAILED DESCRIPTION OF THE PREFERRED EMBODIMENT

Figure 1:
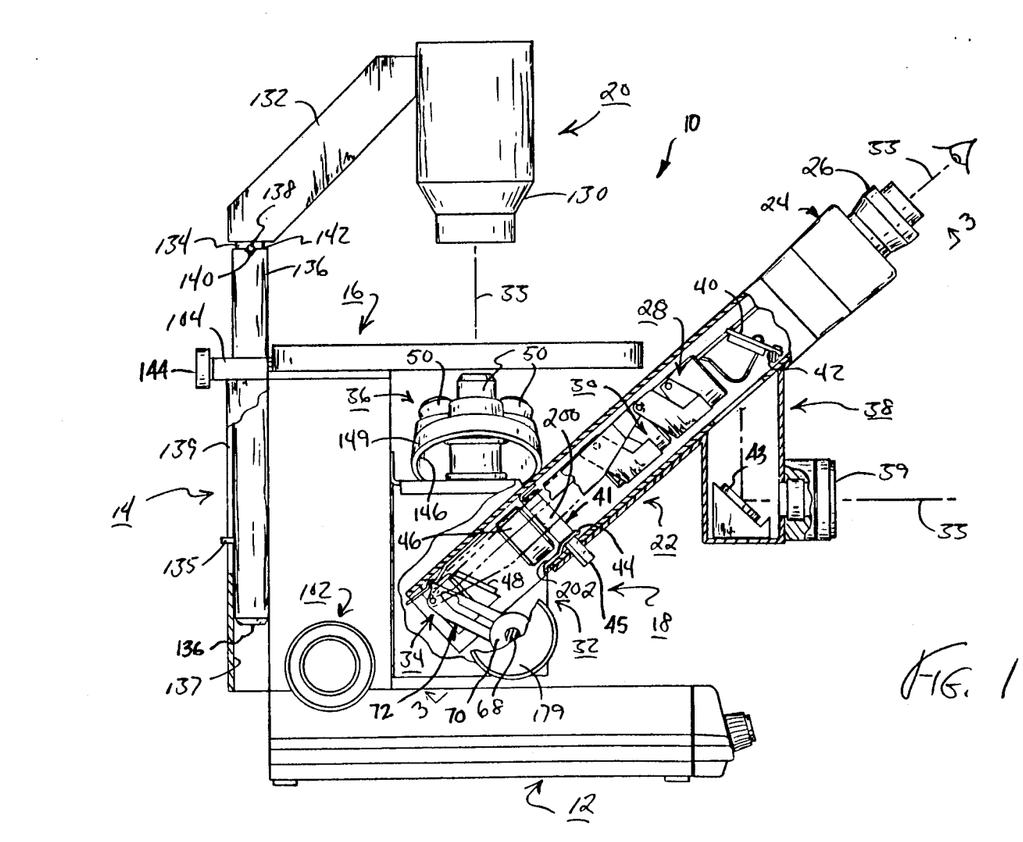
FIG. 1 is a partially sectioned side view of the inverted microscope according to the present invention.
Figure 2:
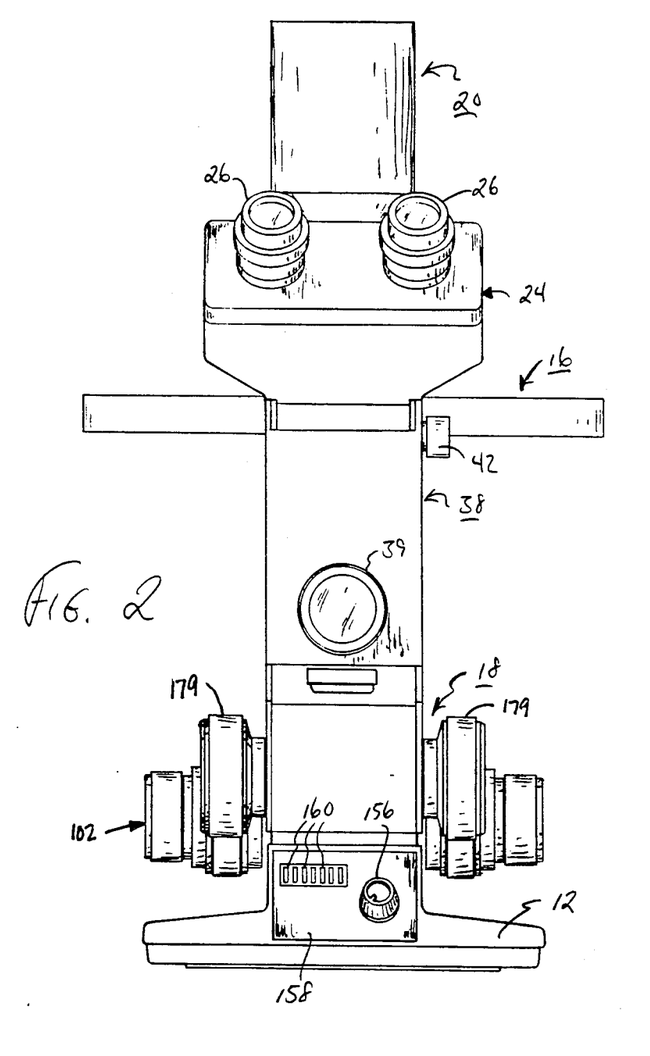
FIG. 2 is a front view of the microscope shown in FIG. 1.

There is shown in FIGS. 1 and 2 an inverted microscope 10 which comprises a base 12, a support column 14 having a stage assembly 16 mounted thereto, and an optical carrier assembly 18 adjustably mounted to the column 14. An illumination system 20 is also adjustably mounted to the column 14. A focus adjustment housing 32 carries a zoom lens housing 22 and a rotatable nosepiece turret 36. The base 12, column 14, zoom lens housing 22 and focus adjustment housing 32 are all economically, yet precisely, manufactured from aluminum extrusions.

Figure 7:
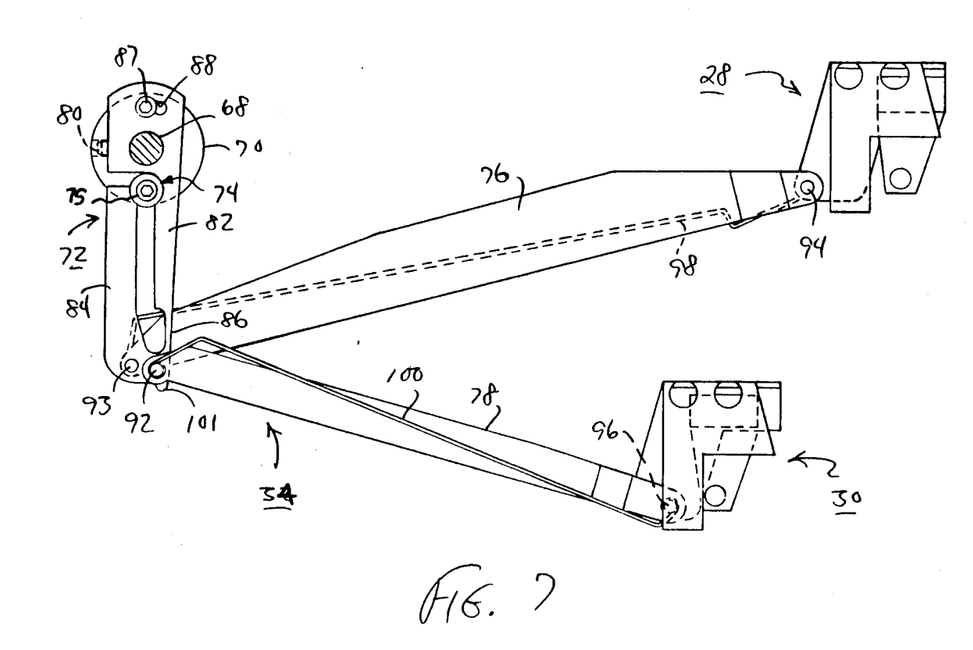
FIG. 7 is an enlarged side view of the crank and linkage zoom mechanism illustrated in FIGS. 1 and 3 showing the linkage and zoom lens assemblies separated for ease of illustration.
Figure 8:
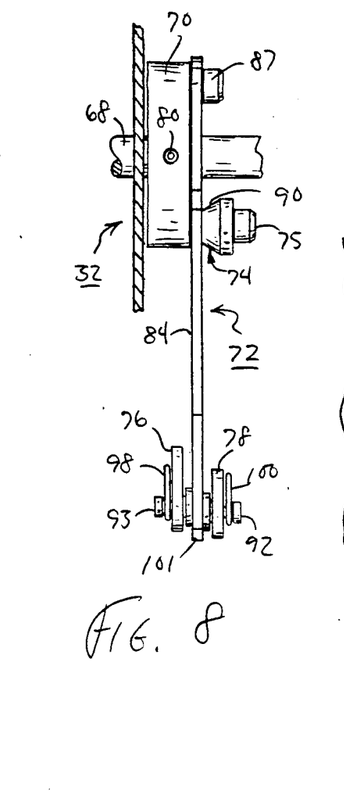
FIG. 8 is an end view of the crank and linkage zoom mechanism shown in FIG. 7.
Figure 12:
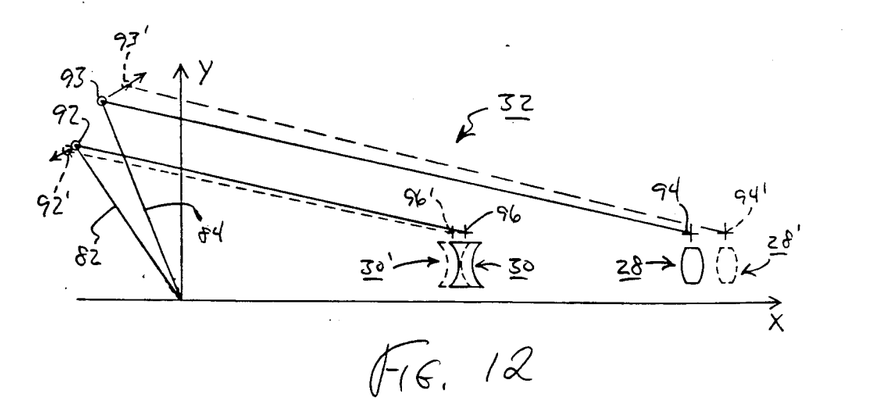
FIG. 12 is a schematic diagram of the crank and linkage zoom mechanism.

The zoom lens housing 22 includes a head 24 having a pair of eyepieces 26. A pair of zoom lens assemblies 28 and 30 are slidably supported within the housing 22 and are movable along optical axis 33 by way of a crank and linkage mechanism 34, as best illustrated in FIGS. 7, 8 and 12.

Figure 3:
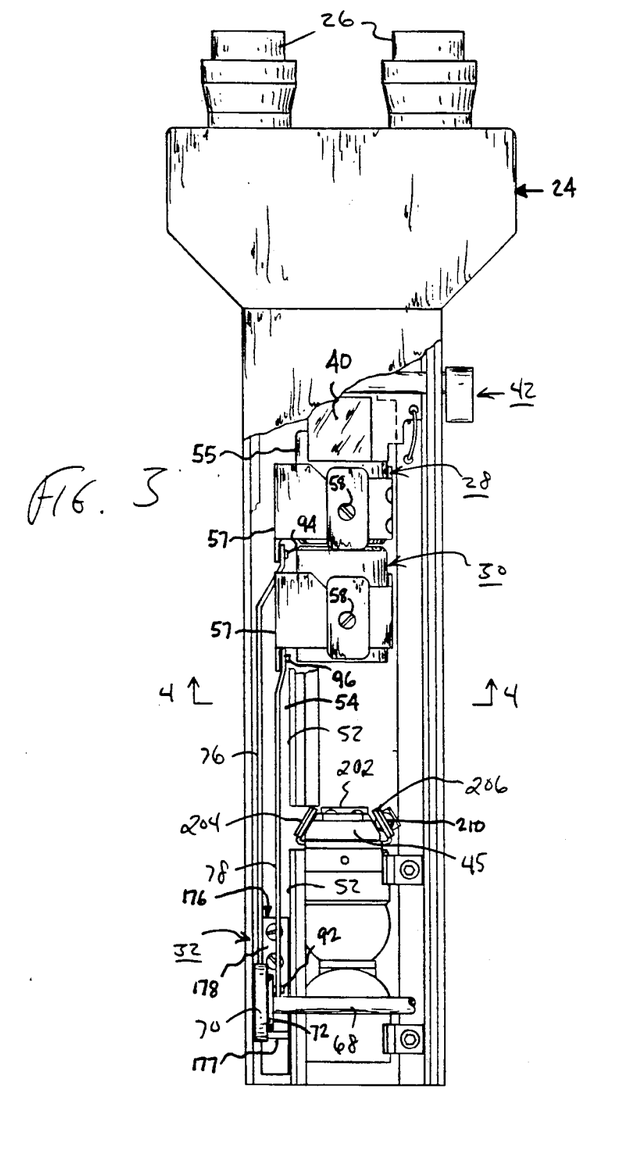
FIG. 3 is a view taken along line 3—3 of FIG. 1.
Figure 13:
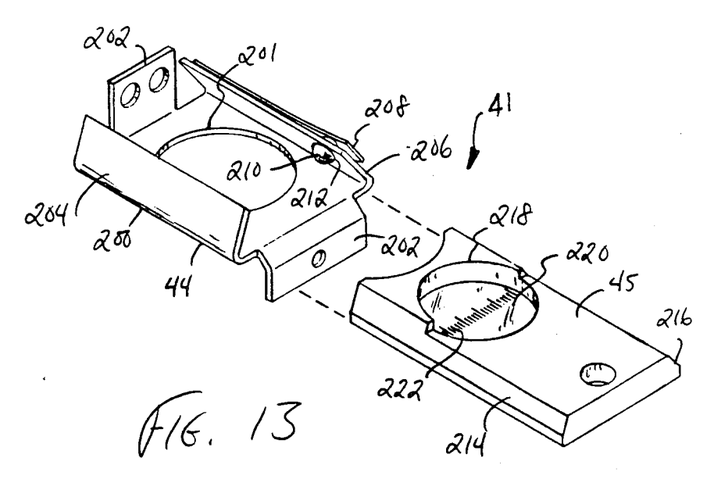
FIG. 13 is an exploded perspective view of the removable reticle plate and reticle carrier.

As best seen in FIGS. 1, 3 and 13, a reticle assembly 41 is mounted to the zoom lens housing 22. The assembly includes a carrier 44 and reticle plate 45.

Zoom lens housing 22 further includes a sub-housing 38 as shown in FIG. 1. Sub-housing 38 includes a suitable mount 39 for attachment of a 35 mm camera or a CCTV. A mirror 40 is mounted to housing 22 by a conventional flipping mechanism 42, as best seen in FIGS. 1 and 2, so as to be rotatable into and out of alignment with the optical axis 33. A further mirror 43 is mounted to sub-housing 38 for deflection of the optical axis 33 by flip mirror 40 through camera mount 39. A still further mirror 48 is mounted to housing 22 at the opposite end from flip mirror 40. Sub-housing 38 is manufactured from the same extrusion as is zoom lens housing 22.

Figure 4:
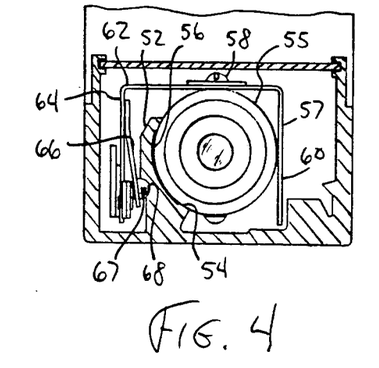
FIG. 4 is a sectional view taken along line 4—4 of FIG. 3.

By referring to FIGS. 3 and 4, it will be seen that a slide track 52 is integrally formed in the zoom lens housing 22 by the extruding process. An arcuate surface 54 is formed on the slide track 52 which has substantially the same curvature as the barrels 55 of the zoom lens assemblies 28 and 30. The lens barrels 55 are mounted to the slide track 52 as shown in FIG. 4. A low friction material 56, such as Teflon ®, is mounted between the lens barrels 55 and the arcuate surface 54. A U-shaped frame 57 is fixed, such as by screw 58, to each lens barrel 55 such that one leg 60 and the base 62 thereof bear against the lens barrel 55. The opposite leg 64 of U-shaped frame 57 straddles slide track 52. A leaf spring 66 is staked to leg 64 and has a low friction material 67, such as Teflon ®, affixed thereto at its approximate end. The low friction material 67 is received in a continuous notch 68 formed in slide track 52. The zoom lens assemblies 28 and 30 are thereby spring loaded to the slide track 52 for essentially friction free movement therealong. Further, by spring loading the zoom lenses 28 and 30 to the slide track 52, their optical alignment along axis 33 is assured.

Additionally, as best illustrated in FIGS. 7 and 8, the crank and linkage mechanism 34 comprises a shaft 68, a crank mount 70, a crank 72, a cone adjuster 74 and a pair of linkages 76 and 78. The crank mount 70 is fixed to shaft 68 by way of set screw 80. Crank 72 comprises a a pair of opposing legs 82 and 84 which are joined by a hinge section 86, as best seen in FIG. 7. The crank 72 is mounted to the crank mount 70 at one point by way of screw 87 which is fitted through an arcuate slot 88 formed in leg 82. The cone adjuster 74 is threadably fixed by screw 75 to the crank mount 70 opposite screw 87 and between the opposing legs 82 and 84. The tapered surface 90 of cone adjuster 74 bears against the opposing legs 82 and 84.

Crank 72 further includes a pair of pivot pins 92, 93 which are mounted on opposite sides of the crank adjacent of hinge section 86. Linkage 76 is mounted at one end to pivot pin 93 and at its opposite end to a pivot pin 94 mounted to zoom lens assembly 28. Linkage 78 is similarly mounted between pivot pin 92 and a pivot pin 96 on zoom lens assembly 30. As best illustrated in FIG. 7, a spring 98 is mounted between the crank pivot pin 93 and the pivot pin 94 of zoom lens assembly 28. A similar spring 100 is mounted between crank pivot pin 93 and the pivot pin 96 of zoom lens assembly 30. Springs 98 and 100 tension the zoom lens assemblies to the crank and thereby compensate for any backlash which may occur. Additionally, crank 72 includes a detent boss 101, which will be more fully described hereinafter.

The zoom lens housing 22 is angularly mounted to the focus adjustment housing 32, as illustrated in FIG. 1. The focus adjustment housing 32 is slidably coupled to the support column 14 for up and down movement by way of a focus adjusting mechanism 102 which is typical to precision optical instruments such as microscopes and, therefore, will not be described in detail.

Figure 5:
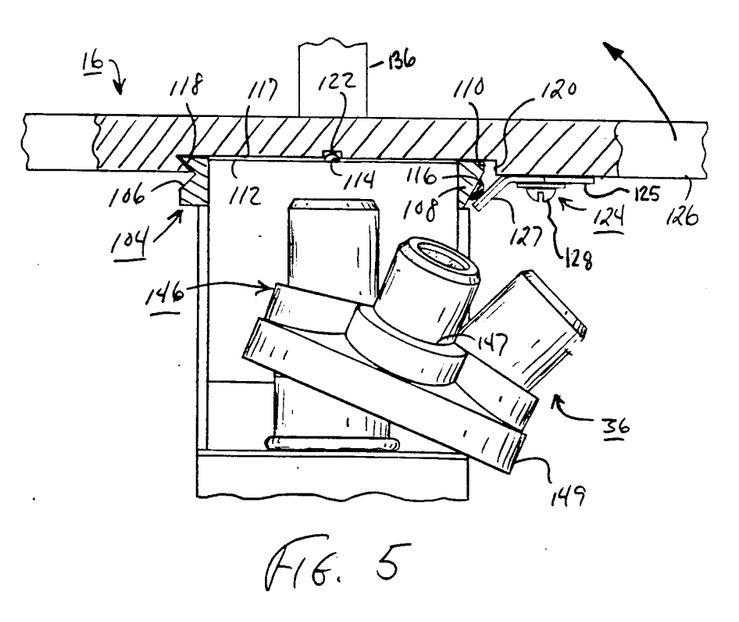
FIG. 5 is an enlarged sectional view of the stage and nosepiece assembly shown in FIG. 1.

As shown in FIG. 5, a substage plate 104 is secured to the column 14 and includes a pair of dovetails 106 and 108. Dovetail 108 has been modified to include a blunt shoulder 110. The substage plate 104 further includes a recess 112 which is formed between the dovetails 106 and 108. A spherical member 114 is staked in the recess 112. Additionally, a further spherical member 116 is staked to dovetail 108 adjacent the blunt shoulder 110.

Figure 6:
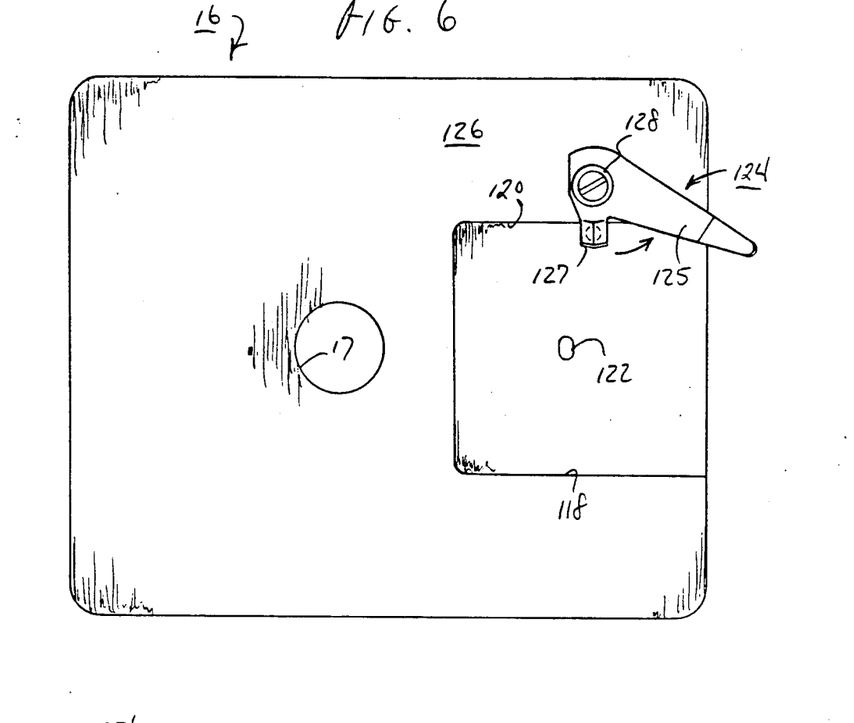
FIG. 6 is a bottom plan view of the stage shown in FIG. 5.

A recessed area 117 is formed in the stage assembly 16 and includes a single dovetail 118, which is designed to mate with dovetail 106 of substage plate 104. The recessed area 117 further includes a perpendicular wall 120 which is in juxtaposition to blunt shoulder 110 of substage plate 104. A slot 122 is formed in the recess 117 for receiving spherical member 114. As best shown in FIGS. 5 and 6, a toggle mechanism 124 is pivotally fixed to the underside 126 of the stage assembly 16 adjacent ball member 116 by way of shouldered screw 128. The toggle mechanism includes a lever arm 125 and a tang 127.

As illustrated in FIG. 1, the illumination system 20 comprises a condenser 130 mounted to an angular support bar 132 which is in turn fixed to a support rod 134. The support rod 134 is slidably received within vertical support tube 136 which is slidably received within bore 137 of column 14. Support tube 136 includes a guide pin 135 which is received within slot 139 formed in column 14. A pin 138 is fixed through support rod 134 and mates with a detent slot 140 formed in the upper end 142 of support tube 136. A thumb screw 144 is threaded to column 14 and bears against the support tubes 136 to lock it to the column 14.

Figure 9:
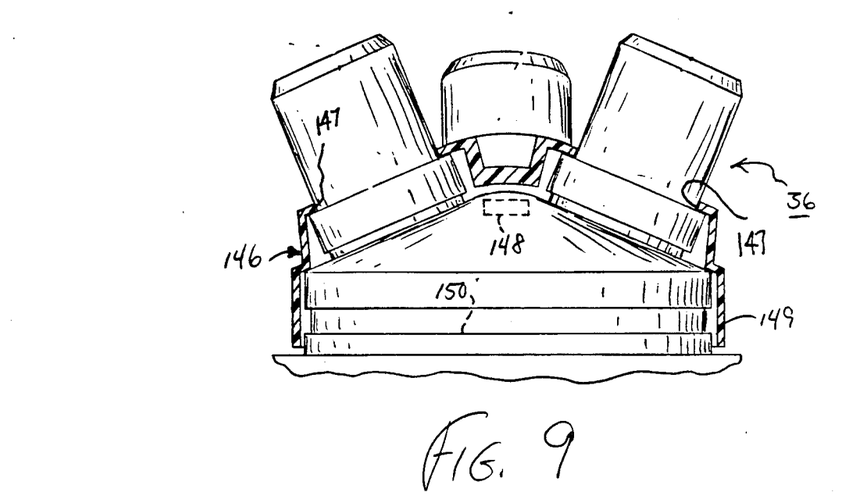
FIG. 9 is a partial sectional view of the nosepiece turret and objective cover taken along line 9—9 of FIG. 5.

The nosepiece turret 36 includes a flexible cover member 146 (as best seen in FIGS. 5 and 9) which is fit over the entire turret 36 including objectives 50. The flexible member 146 includes ports 147 for sealing about the barrels of each objective, a central area 148a for sealing the nosepiece center pivot bearing 148, and a skirt 149 for sealing the outer bearing 150.

Figure 10:
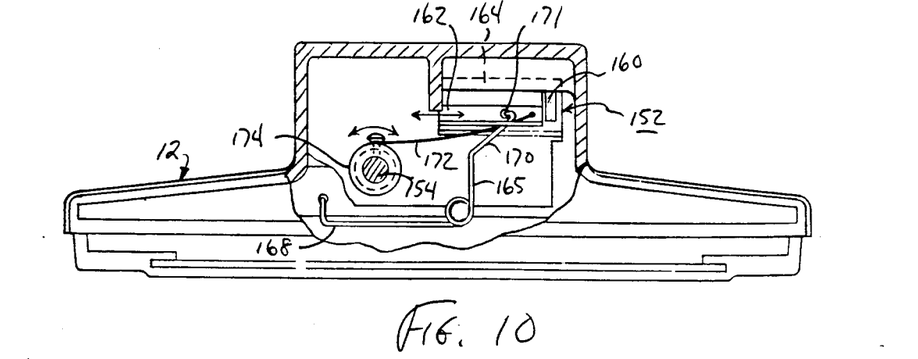
FIG. 10 is a partially sectioned front view of the microscope base (minus the slide plate spring) taken along line 10—10 of FIG. 11.
Figure 11:
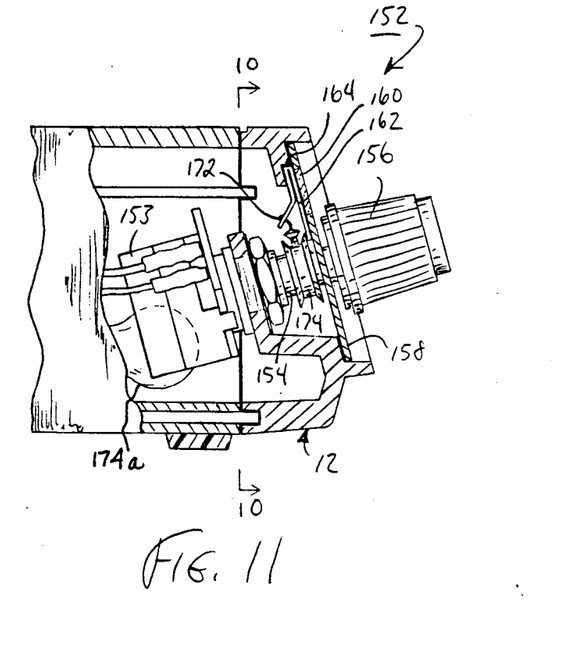
FIG. 11 is a partially sectioned side of the microscope base.

As best shown in FIGS. 10 and 11, a lamp intensity indicator 152 is included in base 12 and comprises a potentiometer 153 which is connected via shaft 154 to knob 156 which extends through cover plate 158. A plurality of windows 160, as best seen in FIG. 2, are incorporated in the cover plate 158. An opaque slide plate 162 is mounted in a channel 164 which is formed in the base 12. As best seen in FIG. 10, a hairpin spring 165 has one of its legs 168 secured to an aperture 169 formed in the base 12 while its other leg 170 is fixed to aperture 171 provided in the opaque slide plate 162. The force exerted by hairpin spring 165 holds the slide plate 162 in the channel 164. A flexible cable 172 is appropriately secured between the opaque slide plate 162 and a wrap reel 174 mounted to shaft 154.

With reference to FIGS. 1 and 3, the previously referenced reticle assembly 41 comprises a reticle carrier 44 and reticle plate 45 positioned in housing 22 between the zoom lenses 28 and 30 and lens 48. As best seen in FIG. 13, the reticle carrier 44 includes a base 200 in which an aperture 201 is formed. The reticle carrier 44 is mounted to housing 22 by a pair of mounting tabs 202 formed at 90° to the carrier. A pair of side walls 204, 206 are bent inwardly toward each other. A leaf spring 208 is appropriately secured, such as by staking, to side wall 206. A ball bearing 210 is received within aperture 212 which has a slightly smaller diameter than the ball bearing. The leaf spring 208 bears against the ball bearing 210 and maintains it in engagement with aperture 212. The reticle plate 45 includes a pair of side walls 214, 216 which are angled toward each other and substantially match the angle of reticle carrier side walls 204, 206. An aperture 218 is formed in the reticle plate 45 and is configured to accept and hold a reticle 220 which has been appropriately marked, for instance, with scale 222. The reticle plate 45 is slidably received within the reticle carrier 44.

THE CRANK AND LINKAGE ZOOM MECHANISM

As previously described, the zoom lens assemblies 28 and 30 are connected to crank 72 by linkages 76 and 78. The crank 72 includes a pair of legs 82 and 84 which are joined by a hinge section 86. The legs are movable with respect to each other by way of cone adjuster 74. This enables a single crank and linkage assembly to be utilized which is adjustable to accommodate for minor variations that may occur in a zoom optical system. Accordingly, the conjugate length of the zoom optical system may be adjusted for tolerance. For instance, by referring to the schematic diagram of the crank and linkage assembly 34 represented in FIG. 12, it will be readily seen that if legs 82 and 84 are further separated from each other, the effective distance between the zoom lens assemblies 28 and 30 is likewise altered. The cone adjuster 74 is utilized for such adjustment and is effected by, for instance, tightening screw 75 which in turn causes tapered surface 90 to force legs 82 and 84 apart thereby flexing hinge section 86. Leg 82 pivots about shaft 68 as the cone 74 is adjusted because the force exerted by the tapered surface against the legs 82 and 84 is equal. A screw of pin 87 carried by crank mount 70 is fitted within a slot 88 formed in leg 82 and acts as a guide member within slot 88 as leg 82 is pivoted. As legs 82 and 84 are moved with respect to each other, the hinge section 86 is caused to flex and the pivot pins 92 and 93 are caused to pivot to new positions, as indicated by the arrows in the drawings. That is, as hinge 86 flexes, pivot pins 92 and 93 are caused to pivot with respect to the hinge 86 which alters their position. In turn, the position of each zoom lens assembly, 28 and 30, is also changed. The new positions, where the lens assemblies are further apart, are indicated schematically by dotted lines in FIG. 12. As pivot pin 93 is farther away from the hinge 86 than pivot pin 92 it moves a greater distance when the image is flexed. The ratio of movement is approximately 3:1.

The zoom optical system carried by housing 22 provides a zoom range of 0.8x to 2.0x±2%. A detent mechanism 176 is provided, as best seen in FIGS. 1 and 3. The mechanism 176 comprises a spring member 178 which is appropriately fixed to housing 22 adjacent crank 72. A notch 177 is formed in spring member 178 and is configured to receive and hold the previously referenced detent boss 101 formed on the crank 72 when the zoom magnification is at approximately 1x. Upon exertion by the operator of a prescribed amount of torque on zoom knobs 179, which are connected to and rotate shaft 68, the spring member 178 is caused to flex thereby allowing the crank boss 101 to be released from engagement from notch 177. Other zoom magnifications within the instrument's range may then be accomplished.

THE RETICLE ASSEMBLY

As previously described, the reticle assembly 43 consists essentially of a reticle carrier 44 secured to the zoom lens assembly housing 22 and a reticle plate 45 which is slidably coupled thereto. It will be seen from FIG. 1 that the reticle plate 45 is positioned in housing 22 so as to (1) form an image plane and (2) to be readily accessible to the operator for ease of removal or change. Additionally, the reticle plate 45 may be partially drawn out of the reticle carrier 44 so that the reticle pattern 222, as best seen in FIG. 13, does not form a visible image in the viewing optics. This is accomplished by simply grasping and pulling the exposed portion of the reticle plate 45 (as best seen in FIG. 1) until it is completely out of the optical path although still retained by carrier 44. The spring 208 and ball roller 206 exerts a force against the reticle plate 45 and will act to secure it in the withdrawn position.

Typically, in the past all inverted microscopes had fixed optics and offered no zoom capabilities whatsoever. In these types of microscopes, the reticles were placed in the intermediate image plane of the eyepiece. While this positioning provides for ease of installation, it had several disadvantages. Should the operator desire to change magnification, it was necessary to change either the objective or the eyepiece or both. As the reticle is calibrated to specific magnification combinations of eyepieces and objectives, a change of the power of the objective or the eyepiece made it mandatory that the reticle also be changed.

Additionally, in many instances, it is desirable to take photographs of the specimen in which there are sizing scales or grids included on the reticle. If, during this process, a change of magnification became necessary the reticle and scale would have to be changed to accommodate the magnification change. The reticle assembly described herein eliminates such problems as the reticle is calibrated to a specific power objective so that any variation of magnification available within the zoom range produces a clear and precise image. In other words, as the image of the reticle overlays the image of the specimen, reticle calibration for a fixed objective is constant regardless of zoom setting. Additionally, as the image of the reticle is overlayed on the specimen image, the image deflected to a camera supported by th camera port 39 can be recorded. No changes are needed to accomplish this feat other than flipping mirror 40 into place.

THE ILLUMINATION SYSTEM

The illumination system 20 comprises a condenser 130 which is adjustably mounted with respect to stage 16 to (1) accommodate for height adjustment, and (2) to allow the condenser to be pivoted 90° in either direction out of the way of the stage. The height adjustment is accomplished by use of thumb screw 144 carried by column 14 which bears against the vertical support tube 136. By loosening the screw 144, the support tube 136 may be adjusted vertically with respect to the stage 16. The tube 136 is restrained from rotating in bore 137 by way of guide pin 135 which is positioned within slot 139 formed in column 14. Further, as the support rod 134 rests on the support tube 136, by grasping either the support rod 134, the support bar 132 or the condenser 130 and lifting upward, the support pin 138 is separated from the support tube detent 140. The support bar 132 and the condenser 130 may be, accordingly, pivoted out of the way. Such an arrangement is desirable when work is being performed on the stage 16. When the work is accomplished, the support bar and condenser may be pivoted back into detented positive alignment with the optical axis 33.

THE QUICK DISCONNECT STAGE

The stage 16 is fixed to the support column 14 by way of a dovetail slide mechanism which incorporates a toggle mechanism 124 for quick and easy attachment or removal of the stage 16. It will be seen from FIGS. 5 and 6 that by pivoting the arm 125 of toggle mechanism 124 in the direction of the arrow shown in FIG. 5, tang 127 is released from engagement with ball member 116 which, in turn, releases stage dovetail 118 from engagement with substage dovetail 106. The stage then may be tipped in the direction indicated by the arrow in FIG. 6, so that stage dovetail 118 pivots about substage dovetail 106. Accordingly, the stage 16 is easily separated from the substage 104 so that it may be taken to a separate work area for continued work upon the specimen being examined or for preparation of a further specimen. It also may be advantageous during examination to interchange one stage for another stage. The quick disconnect system allows for such ready interchange.

The stage 16 is readily reattached to the column 14 simply by reversing the above procedure. The previously described ball member 114 positioned in the substage recess 112 receives and positions the slot 128 formed in the stage recess 117 which assures that the position of the stage 16 and aperture 17 therein is substantially aligned with respect to the optical axis 33.

THE ILLUMINATOR INTENSITY READOUT

As best illustrated in FIGS. 10 and 11, a lamp indicator 152 is supported within the base 12 which mechanically indicates the intensity of the light being emitted by the condenser 130. As previously described, an opaque slide plate 162 is mechanically connected by way of flexible cable 172 to the shaft 154 controlling the potentiometer 153. The opaque slide plate 162 is further connected by way of a hairpin spring 165 to the base 12. By rotating the knob 156 cable 172 is wrapped upon wrap reel 174 thereby pulling opaque slide plate 162 across channel 164 which, in turn, uncovers windows 160 formed in cover plate 158. A lamp assembly 174 is positioned in base 12 adjacent the windows 160 and slide plate 162. The lamp assembly is wired to be energized simultaneously when the condenser 130 is energized, but is not controlled by the potentiometer 153. When the condenser 130 is at full intensity, as controlled by the potentiometer 153, the opaque slide plate 162 is drawn fully out of the way so that all of the windows 160 are exposed and emitting light from the lamp assembly 174a. As the intensity of the condenser 130 is reduced by rotating knob 156 which controls potentiometer 153, the opaque slide plate 162 is drawn back along channel 164. Depending on the intensity of the condenser 130, either some or all of the windows 160 are exposed and, therefore, emit light. A quick and simple visual reference to lamp intensity is achieved.

THE NOSEPIECE TURRET COVER

The flexible turret cover 146 is manufactured from any suitable material, for example, butyl rubber, such that it may be easily formed to imitate the shape of the turret 36 and objectives secured thereto. The cover includes a plurality of raised sealing ports 147 which are apertured to fit over the requisite number of objectives being utilized. As seen in FIG. 7, the cover 146 further includes a skirt 149 which extends to at least cover outer bearing 150. It will be appreciated that in conditions normal to the environment in which an inverted microscope is utilized, corrosive, or other harmful, substances may accidentally leak from the stage 16 and into contact with the turret 36 and/or objectives. These corrosive substances may, if left uncleaned, cause damage to any or all of the objective threads, the turret center bearing 148 or to the outer bearing 150. The flexible turret cover 146 effectively protects against such deleterious occurrences.

THE CAMERA MOUNT

The inverted microscope 10 is manufactured to include a sub-housing 38 having a camera mount 39 to which a typical 35 mm camera back may be fixed. It will be appreciated from the drawings that the camera mount 39 is located below the head 24 and eyepieces 26 rather than above as is nearly always the case in inverted microscopes. The location of the camera below the viewing optics, as set forth herein, offers several advantages. For instance, the mounted camera is not physically positioned in the way of the operator's line of vision to the stage nor does it impede ready access to the stage as would a camera mounted above the viewing optics. Further, the position of camera mount 39 permits the camera to be attached horizontally so that the data back can be easily set and read by the operator without moving from a normal examining posture.

However, having described the invention, many modifications thereto will become apparent to one skilled in the art to which is pertains without departing from the spirit of the invention as set forth in the claims appended hereto.

I claim:

1. A cover member for protecting the rotatable turret and objectives of an inverted microscope comprises a sealing member sized to fit over and encompass the entire turret, said cover member having a plurality of apertures therein for closely fitting about and sealing the area of juncture between the objectives and the rotatable turret.

2. The protective cover as set forth in claim 1 wherein said sealing member further includes a skirt portion which extends over the covers the edge of said rotatable turret.

3. The protective cover as set forth in claim 1 wherein said cover is flexible.

* * * * *